April 10, 1928.
R. L. REICHARD
ADVERTISING DEVICE
Filed Aug. 19, 1926
1,665,894
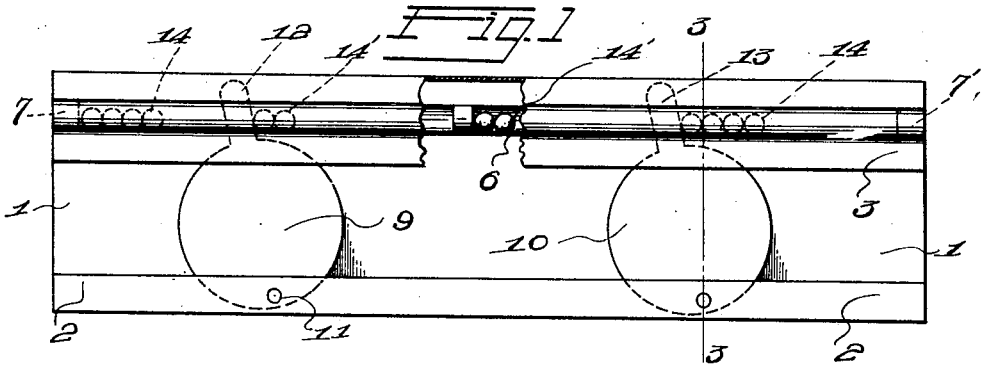
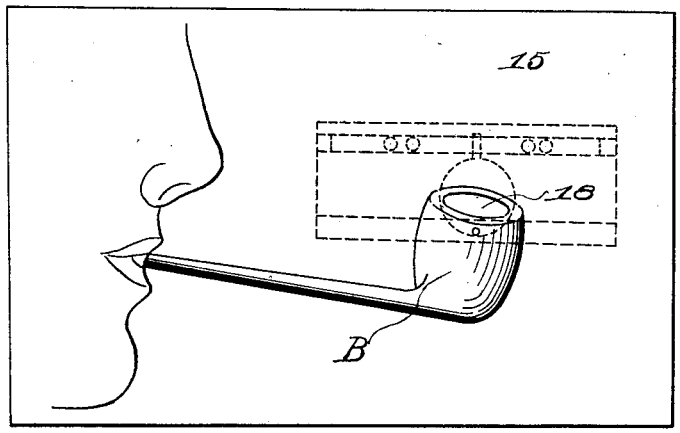
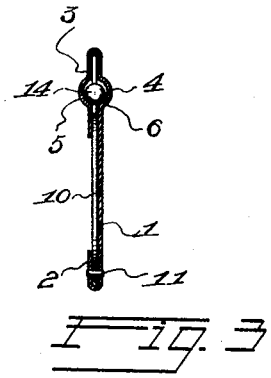
Inventor
Russell L. Reichard
By
Attorney Patented Apr. 10, 1928.

1,665,894

UNITED STATES PATENT OFFICE.

RUSSELL L. REICHARD, OF ALLENTOWN, PENNSYLVANIA.

ADVERTISING DEVICE.

Application filed August 19, 1926. Serial No. 130,287.

This invention relates to improvements in advertising devices, and more particularly to that class of devices in which an object is actuated by a movable element or elements, which elements are free to be moved by the vibration or movement of the object to which the device is secured.

More particularly the invention comprises a device in which there are pivoted elements adapted to be rocked by suitably contained balls, whose movements are controlled by the vibration or movement of a vehicle, such as a street car, motor buss, or the like, the device being such that these balls will be quickly operated upon by the starting and stopping of the vehicle, or by a jar of the vehicle in motion, or in fact, any movement whatever of the vehicle, that will momentarily change the position of the device from its normal or horizontal position to a more or less tilted one, as for instance by the vehicle running over rough surfaces, or up or down inclines, etc. The balls are adapted to be moved and guided in a suitable track or groove, and projected with sufficient force against the pivoted device or devices to cause it, or them, to be rocked in one direction or the other or to remain upright as the case may be, but in any event, to change the position of the rockable device or devices, to bring about the desired ocular effects. These rockable devices may be provided with any pictorial devices appropriate to the thing to be advertised, and may for instance, as shown in one embodiment of the invention be provided as a background for eye openings, or slits, in a face of any character whatever, and provided with markings indicating eyes, so that when the rockable devices are moved the face will have the appearance given by moving eyes, thus serving to attract notice of observers.

In the drawings there is also shown one of the rockable devices arranged for instance, behind a cut out portion in the sign, representing the opening in a smoking pipe, in which case the rockable member may be provided with a red portion indicating the glow of the pipe, which portion when rocked behind the pipe opening will present a color contrasting with the glow, thus giving the impression and appearance of the pipe being puffed or smoked.

In the drawings illustrating the invention:

Figure 1 is a front elevation of the device.

Figure 2 is a front elevation showing the device in dotted lines and secured to the back of a card in which there are provided eye openings, the rockable members or disks having markings thereon indicating eyes in a face of a comical figure.

Figure 3 is a vertical section on about line 2—2 of Figure 1.

Figure 4 is an edge view of the card with the metallic plate secured thereto.

Figure 5 is a view showing another application of the invention.

Referring to the drawings:

The numeral 1 designates a metallic plate or strip provided at its lower edge with an upturned flange or lip 2. At the upper edge of this plate is another flange 3, formed by bending the plate upon itself. The back of the plate is provided with a bead 4, and the flange 3, is likewise provided with a bead 5, the beads coming opposite each other, thus forming a circular groove 6. The ends of the groove are closed by plugs 7 and 7', and intermediate of the plugs, and fitting tightly within the groove is a stop 8.

The numerals 9 and 10 designate rockable disks each pivoted at 11 between the flange 2 and the body of the plate. These disks are each provided with upwardly extending tabs or arms 12 and 13 respectively, adapted to be engaged by balls 14 and 14', which are loosely confined in the grooves 6. Any number of balls may be employed, but preferably I interpose between the plugs 7 and the arms 12 and 13 at the end of the plate, four balls, while between said arms and the stop 8 I provide two on each side of the stop.

There is sufficient space between the upcase the card may be cut out to form an provide for the free movement of the disks in either direction, while at the same time this flange and plate, of which it is a part, serve as a guide for the upper portions of the disk, and serve to keep them in upright position, and to prevent them from binding on their pivots in the lower flange 2.

Referring to Fig. 2, the numeral 15 designates a card, which may be of any suitable character, and bear any suitable illustration.

In the present instance there is shown a comical figure A, and the card is cut out as indicated at 16, which in this embodiment of the invention represents the eye openings of the face of the comical figure. The disks bear markings 17, indicating the iris and pupil of the eyes, and are shown at one side of the eye opening. Obviously, when the left hand end of the device is tilted from the position shown, the balls 14, at one end of the groove will roll against the arm or tab of the disk 9, and the balls 14' at the same end will roll away from said arm toward the stop 8. Meanwhile, the balls 14, at the other end of the plate will roll toward the plug 7' and the balls 14' at the same end will engage the arm 13 of the disk 10, thus causing the disks to shift their positions, and in so doing create the impression or appearance of rolling of the eyes in the face of the figure A. It is not to be understood, of course, that these balls necessarily move to their extreme positions upon each vibration or movement of a vehicle, or other support for the advertising device, as obviously they may move only a short distance toward and away from the arms, and may touch lightly said arms, thus causing a slight movement or rocking of the disks and thereby cause the appearance of a quiver, rather than a complete movement from one side of the eye opening to the other.

Referring to Fig. 5, the card 15, has upon it an illustration of a pipe B, and in this case the card may be cut out to form an opening 18, behind which a single disk will appear, corresponding in every way to either of the disks 9 or 10 heretofore mentioned, and as before intimated this disk may be colored in such a way when rocked or moved behind the opening, the glow and gray of the ash may be indicated. The pipe in such a case will ordinarily be shown associated with the illustration of a smoker. However, it is to be understood that I, in no way, limit myself to the character of the figures employed, and it is to be understood that the invention consists in the novel manner in which the device in itself is constructed and operated.

Obviously, a slight tilting movement of the left hand side of the plate will cause all of the balls to change their position, four of the balls 14 running away from the arms 13, while the other four will run against the arm 12 of the disk 9. In such a position two of the balls 14' will actuate the disk 10, and four of the balls 14 will actuate the disk 9, and so on.

Claims:

1. An advertising device comprising a plate, disks pivoted at one side of the plate and adapted for the reception of suitable display matter, means for rocking said disks upon their pivots when the plate is tilted, a card secured to said plate and having openings therein opposite the disks, said disks being adapted to rock from one side to the other of said openings, and thereby display through said openings the display matter thereon.

2. An advertising device comprising a plate adapted for use in connection with a member having display openings therein, said plate having a track or groove at one side thereof, a rockable member pivoted to the plate for parallel movement with said plate and having display matter thereon visible through said display openings, operating means loosely confined in the groove or track and adapted to operate directly on the pivoted member upon tilting movement of the plate.

3. An advertising device comprising a plate adapted for use in connection with a member having display openings therein, said plate having a track or groove at one side thereof, a rockable member pivoted to the plate for parallel movement with said plate and having display matter thereon visible through said display openings, balls loosely confined in the groove or track and adapted to operate directly on the pivoted member upon titling of the plate.

4. An advertising device comprising a plate adapted for use in connection with a member having a display opening therein, said plate having a groove or track at one side thereof, a rockable member pivoted to the plate for parallel movement with said plate, and having display matter thereon visible through said display opening, operating means loosely confined in the groove or track, an extension on the rockable member extending within the path of movement of the operating means, whereby the disks are rocked from side to side when the plate is rocked.

In testimony whereof he affixes his signature.

RUSSELL L. REICHARD.